(12) United States Patent
Li et al.

(10) Patent No.: US 11,495,210 B2
(45) Date of Patent: Nov. 8, 2022

(54) ACOUSTIC BASED SPEECH ANALYSIS USING DEEP LEARNING MODELS

(71) Applicant: MICROSOFT TECHNOLOGY LICENSING, LLC, Redmond, WA (US)

(72) Inventors: Ji Li, San Jose, CA (US); Amit Srivastava, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 39 days.

(21) Appl. No.: 16/710,442

(22) Filed: Dec. 11, 2019

(65) Prior Publication Data

US 2021/0118426 A1 Apr. 22, 2021

Related U.S. Application Data

(60) Provisional application No. 62/923,312, filed on Oct. 18, 2019.

(51) Int. Cl.

| | |
|---|---|
| *G10L 15/06* | (2013.01) |
| *G10L 15/02* | (2006.01) |
| *G10L 15/22* | (2006.01) |
| *G10L 15/18* | (2013.01) |
| *G10L 15/04* | (2013.01) |
| *G10L 25/24* | (2013.01) |

(Continued)

(52) U.S. Cl.
CPC .......... *G10L 15/063* (2013.01); *G06N 3/0445* (2013.01); *G06N 3/0454* (2013.01); *G06N 3/08* (2013.01); *G10L 15/02* (2013.01); *G10L 15/04* (2013.01); *G10L 15/18* (2013.01); *G10L 15/22* (2013.01); *G10L 25/18* (2013.01); *G10L 25/24* (2013.01); *G10L 25/90* (2013.01)

(58) Field of Classification Search
CPC ......... G10L 15/02; G10L 15/22; G10L 15/18; G10L 25/18; G06N 3/08
USPC .................................................. 704/233, 249
See application file for complete search history.

(56) References Cited

U.S. PATENT DOCUMENTS

| | | | |
|---|---|---|---|
| 9,070,360 B2 | 6/2015 | Yu et al. | |
| 9,916,538 B2 * | 3/2018 | Zadeh | .................. A61B 5/7221 |

(Continued)

FOREIGN PATENT DOCUMENTS

CN 111414561 A * 1/2019 ........... G06F 16/338

OTHER PUBLICATIONS

Increase Apparent Public Speaking Fluency by Speech Augmentation, Sagnik Das, Aug. 3, 2019.*

(Continued)

*Primary Examiner* — Akwasi M Sarpong
(74) *Attorney, Agent, or Firm* — NovoTechIP International PLLC

(57) ABSTRACT

A method and system for detecting one or more speech features in speech audio data includes receiving speech audio data, performing preprocessing on the speech audio data to prepare the speech audio data for use as an input into one or more models that detect one or more speech features, providing the preprocessed speech audio data to a stacked machine learning model, and analyzing the preprocessed speech audio data via the stacked ML model to detect the one or more speech features. The stacked ML model includes a feature aggregation model, a sequence to sequence model, and a decision-making model.

20 Claims, 8 Drawing Sheets

(51) Int. Cl.
*G10L 25/18* (2013.01)
*G10L 25/90* (2013.01)
*G06N 3/08* (2006.01)
*G06N 3/04* (2006.01)

(56) References Cited

U.S. PATENT DOCUMENTS

| | | | | |
|---|---|---|---|---|
| 10,318,552 | B2* | 6/2019 | Baughman | G06F 16/285 |
| 10,560,313 | B2* | 2/2020 | Sglavo | H04L 41/16 |
| 2003/0115054 | A1* | 6/2003 | Iso-Sipila | G10L 15/02 |
| | | | | 704/233 |
| 2003/0115064 | A1* | 6/2003 | Gusler | G10L 21/028 |
| | | | | 704/E21.013 |
| 2016/0093293 | A1* | 3/2016 | Lee | G10L 15/02 |
| | | | | 704/249 |
| 2016/0253999 | A1* | 9/2016 | Kang | G10L 25/75 |
| | | | | 704/249 |
| 2018/0011839 | A1* | 1/2018 | Gallé | G06N 7/005 |
| 2019/0110754 | A1* | 4/2019 | Rao | G16H 50/20 |
| 2019/0172458 | A1* | 6/2019 | Mishra | G06K 9/6271 |
| 2019/0279618 | A1* | 9/2019 | Yadav | G06F 40/30 |
| 2019/0340235 | A1* | 11/2019 | Osbourne | G10L 19/083 |
| 2019/0385711 | A1* | 12/2019 | Shriberg | G16H 50/20 |
| 2020/0005794 | A1* | 1/2020 | Kim | B25J 9/16 |
| 2020/0065612 | A1* | 2/2020 | Xu | G06V 10/82 |
| 2020/0175962 | A1* | 6/2020 | Thomson | G10L 15/197 |
| 2020/0226476 | A1* | 7/2020 | Wang | G06N 3/0445 |
| 2020/0394999 | A1* | 12/2020 | Levine | G11B 27/031 |
| 2020/0410157 | A1* | 12/2020 | van de Kerkhof | G06F 40/166 |
| 2021/0012236 | A1* | 1/2021 | Carrasco | G06N 5/04 |
| 2021/0089953 | A1* | 3/2021 | Bocharov | G06N 20/00 |

OTHER PUBLICATIONS

"Presenter Coach in PowerPoint for the Web", Retrieved From: https://www.youtube.com/watch?v=Zx56ra4XtXM#action=share, Jun. 18, 2019, 1 Page.

Das, et al., "Increase Apparent Public Speaking Fluency By Speech Augmentation", In Repository of arXiv:1812.03415v2, Aug. 3, 2019, 08 Pages.

Lopez-De-Ipina, et al., "On the Analysis of Speech and Disfluencies for Automatic-etection of Mild Cognitive Impairment", In Journal of Neural Computing and Applications, vol. 32, Issue 20, May 8, 2018, pp. 15761-15769.

"International Search Report and Written Opinion Issued in PCT Application No. PCT/US20/054657", dated Jan. 26, 2021, 11 Pages.

Sainath, et al., "Convolutional, Long Short-Term Memory, fully connected Deep Neural Networks", In Proceedings of International Conference on Acoustics, Speech, and Signal Processing, Apr. 19, 2015, pp. 4580-4584.

Szczurowska, et al., "The Application of Kohonen and Multilayer Perceptron Networks in the Speech Nonfluency Analysis", In Journal of Archives of Acoustics, vol. 31, Issue 4, Jan. 1, 2014, pp. 205-210.

* cited by examiner

ACOUSTIC BASED SPEECH ANALYSIS USING DEEP LEARNING MODELS

CROSS-REFERENCE TO A RELATED APPLICATION

This patent application claims the benefit of priority to U.S. Provisional Application No. 62/923,312 entitled "Acoustic Based Speech Analysis Using Deep Learning Models," filed on Oct. 18, 2019, the entirety of which is incorporated herein by reference.

BACKGROUND

Many people struggle with public speaking, particularly when it involves giving a presentation or a speech. In fact, fear of public speaking is one of people's most common fears. This type of fear often affects the quality of a person's speech. For example, when nervous, some people begin speaking too fast. Others begin talking too slow, pausing too long in between words, using too many filler words or being disfluent in their speech.

A common method of decreasing nervousness and improving the quality of a person's speech is to practice giving the speech beforehand. This may be done in front of a mirror to examine the body language. While this may be helpful in correcting improper or distracting body language, it does not always help the speaker identify speaking issues. For example, it may be difficult for a person practicing a speech to realize some of the shortcomings of their speech and determine how to improve it, even if they are practicing in front of a mirror.

To help address this need, some recent applications have been developed that provide speech rehearsal assistance by analyzing a person's speech and providing feedback to them. To analyze speech in a way that is conducive to providing helpful feedback, certain aspects of the person's speech have to be examined. This may be achieved by using various mechanisms. However, existing mechanisms for analyzing features of speech suffer from many disadvantages. For example, an automatic speech recognition (ASR) system can be used to analyze speech features. However, an ASR system is generally very large in inference, since an ASR system is large in size. As a result, use of an ASR system is generally very resource and time extensive. An ASR system is also expensive to train and deploy.

Hence, there is a need for improved systems and methods of providing speech analysis.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving speech audio data, performing preprocessing on the speech audio data to prepare the speech audio data for use in training one or more models that detect one or more speech features, and providing the preprocessed speech audio data to a stacked machine learning (ML) model for training the stacked ML model to detect the one or more speech features. The stacked ML model includes a feature aggregation model, a sequence to sequence model, and a decision-making model.

In yet another general aspect, the instant disclosure presents a data processing system having a processor and a memory in communication with the processor wherein the memory stores executable instructions that, when executed by the processor, cause the data processing system to perform multiple functions. The function may include receiving speech audio data, performing preprocessing on the speech audio data to prepare the speech audio data for use as an input into one or more models that detect one or more speech features, providing the preprocessed speech audio data to a stacked machine learning model, and analyzing the preprocessed speech audio data via the stacked ML model to detect the one or more speech features. The stacked ML model includes a feature aggregation model, a sequence to sequence model, and a decision-making model.

In a further general aspect, the instant application describes a method for detecting one or more speech features in speech audio data. The method may include receiving speech audio data, performing preprocessing on the speech audio data to prepare the speech audio data for use as an input into one or more models that detect one or more speech features, providing the preprocessed speech audio data to a stacked machine learning model, and analyzing the preprocessed speech audio data via the stacked ML model to detect the one or more speech features. The stacked ML model includes a feature aggregation model, a sequence to sequence model, and a decision-making model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
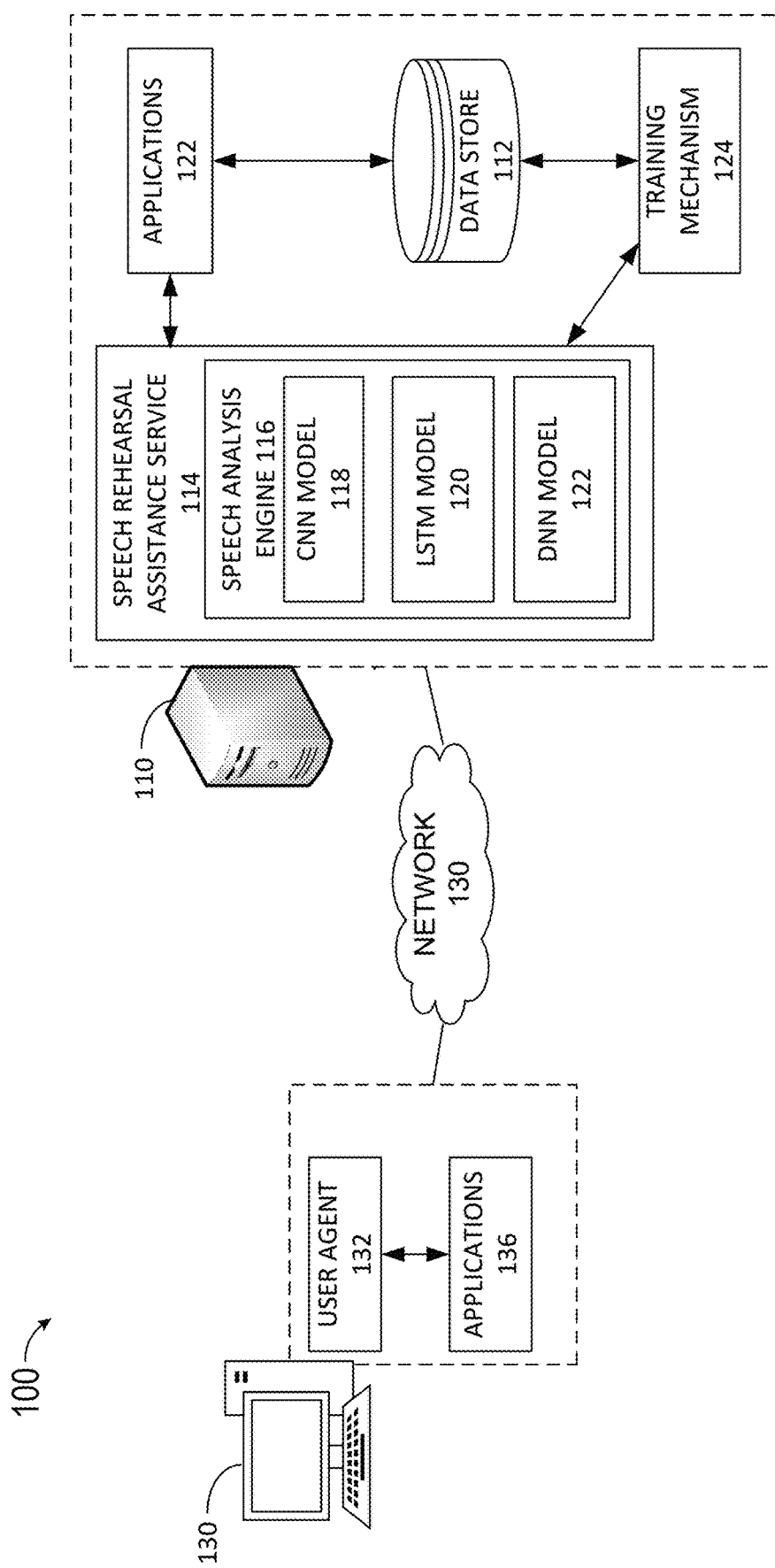
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Fear of public speaking is often ranked as one of people's worst fears. Yet, giving presentations and occasional speeches is part of many careers and activities, and as such a common occurrence for many people. When a person is nervous or uncomfortable, their normal manner of speaking may be altered without them even realizing it. For example, they may begin using too many filler words, or being otherwise disfluent.

A common solution for improving the quality of a presentation or speech is to practice beforehand. This may be done in front of a mirror, for example, to observe body language, or if possible, in front of another person who can point out shortcomings that the presenter may be unaware of. Practicing in front of a mirror, however, does not always result in the speaker being able to identify issues in their speech. For example, when you are focused on examining your body language, you may not notice the rate of your speech or realize that you are using too many filler words. However, practicing in front of another person is not always an option. Furthermore, even if that is a possibility, the person may not be able to point out the different issues.

To address these issues, recently some programs have been developed for providing real-time feedback regarding the quality of a person's speech by analyzing one or more parameters of the speech. In an example, utterance of filler words and sounds or disfluency in speech may be detected and notification may be provided to the speaker in real-time to inform the user of issues they need to address. This may be done by examining the speech transcript provided by an ASR to identify filler words. However, ASRs generally require extensive resources and as such are expensive to train and deploy. Other currently available mechanisms for analyzing speech features suffer from limited accuracy or limited focus on specific features, and/or are difficult to train and deploy. As a result, currently used programs that provide feedback regarding the quality of a person's speech are either inefficient or inaccurate or are difficult to train. Furthermore, these programs may require a lot of resources to deploy, which may result in the final program being expensive in resources and cost.

To address these technical problems and more, in an example, this description provides a technical solution for providing an integrated system for conducting speech analysis which uses a stacked deep learning model. This may involve combining multiple deep learning models by using each model for a specific task. In one implementation, this involves use of a deep convolutional neural network (CNN) model for extracting desired speech features, utilizing a long short-term memory (LSTM) neural network model for learning sequences indicative of certain speech features and generating high level features, and using a deep neural network (DNN) model for making final predictions based on the prediction sequences identified by the LSTM model. This integrated system may be able to make decisions on the fly, thus increasing the speed and accuracy of the entire system. In one implementation, to further increase efficiency, the integrated system can be compressed by downsampling inputs before they are provided to the first model.

As will be understood by persons of skill in the art upon reading this disclosure, benefits and advantages provided by such implementations can include, but are not limited to, a solution to the technical problems of inefficient, inaccurate and/or expensive analysis of speech features. Technical solutions and implementations provided here optimize the process of speech analysis for identifying speech features that can be used in providing feedback to the person. These speech features are identified by utilizing deep learning models that are highly accurate, yet simpler to train and use than existing mechanisms. The benefits made available by these solutions provide a small in size and resources deep learning model that achieves similar results as models that are much more complex, thus increasing efficiency and decreasing expenses.

As a general matter, the methods and systems described herein may include, or otherwise make use of, a machine-trained model to identify features related to speech. Machine learning (ML) generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in people's speech, determine associations between spoken words and/or identify filler words or speaking disfluency in speech. Such determination may be made following the accumulation, review, and/or analysis of user data from a large number of users over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate identification of speech features and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a stacked trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

FIG. 1 illustrates an example system 100, upon which aspects of this disclosure may be implemented. The system 100 may include a sever 110 which may be connected to or include a data store 112 which may function as a repository in which datasets relating to training models, data relating to the speech rehearsal assistance service 114 and/or data relating to applications 122 may be stored. Although shown as a single data store, the data store 112 may be representative of multiple storage devices and data stores which may be connected to each of the speech rehearsal assistance service 114, applications 122 or models 118, 120 and 122. Moreover, the sever 110 may include a plurality of servers that work together to deliver the functions and services provided by each service or application. The server 110 may operate as a shared resource server located at an enterprise accessible by various computer client devices such as client device 130. The server may also operate as a cloud-based server for offering speech rehearsal assistance services in one or more applications such as applications 122.

The server 110 may include and/or execute a speech rehearsal assistance service 114 which may provide intelligent speech rehearsal feedback for users utilizing an application on their client devices such as client device 130. The speech rehearsal assistance service 114 may operate to examine data received from a user's client device via an application (e.g., applications 122 or applications 136), examine the data and provide feedback to the user regarding their speech or presentation. In an example, the speech rehearsal assistance service 114 may utilize a speech analysis engine 116 to examine the user's speech, identify specific characteristics of the speech and provide feedback regarding the user's speech (use of filler words, fluency, clarity, stress level and the like). To achieve this, the speech analysis engine 116 may make use of multiple neural network models that operate together to provide efficient and accurate results. These models may include a CNN model 118, a LSTM model 120 and a DNN model 122. Other models may also be used.

Each of the models used as part of the speech rehearsal assistance service may be trained by a training mechanism such as mechanisms known in the art. The training mechanism may use training datasets stored in the datastore 112 or at other locations to provide initial and ongoing training for each of the models 118, 120 and 122. In one implementation, the training mechanism may use labeled training data from the data store 112 to train each of the models 118, 120 and 122, via deep neural networks. The initial training may be performed in an offline stage.

In one implementation, the training sets include a switchboard dataset that is derived from two-sided telephone conversations among numerous speakers from different geographical regions (e.g., various states from the United States) on various topics (e.g., 70 different topics). This dataset may be sampled at a specific rate (e.g., 8 kHZ) and labeled via human labeling to identify characteristics such as filler phrases (e.g., use of filler words such as um, uh, like, etc.), disfluency, indications of stress, lack of clarity and the like in the audio conversations. These characteristics may be aligned with the audio files to label the training set. In an example, one or more flags may be used to indicate at which point in an audio file, a speech feature is identified and/or the duration of the speech feature. For example, an audio file may be labeled as having a filler phrase "um" at time 3:21 (3 minutes and 21 seconds) and the labeling may indicate that the filler pause lasts for 5 seconds. The human labeling may require a standardized set of guidelines for identifying characteristics such as filler phrases, disfluency, indications of stress, lack of clarity. For example, the guidelines may indicate that repeating a word twice or more in a row qualifies as a disfluency. It should be noted that the switchboard dataset, while helpful in training the models, may not be ideal since it provides two-way conversations as opposed to the typical input for a speech rehearsal service which is a monolog. Thus, in one implementation, a dataset of speech audio data may also be used. For example, data may be collected and used from presentation rehearsal applications. The presentation rehearsal audio data may be collected as part of the process of providing speech rehearsal assistance via an application. For example, when permission is granted and while privacy concerns are addressed, audio data from user's rehearsal sessions may be collected, labeled and used to train each of the models 118, 120 and 122. The data store 112 may also include test result datasets for testing the models 118, 120 and 122 after they have been trained to ensure their accuracy. In one implementation, the types of data used for training the models may be different from the types of data used for testing the models. In an example, data from two-sided telephone conversations is used for training and development of the models, while speech data is utilized to evaluate accuracy of the models.

The client device 130 may be connected to the server 110 via a network 130. The network 130 may be a wired or wireless network(s) or a combination of wired and wireless networks that connect one or more elements of the system 100. The client device 130 may be a personal or handheld computing device having or being connected to input/output elements that enable a user to interact with various applications (e.g., applications 122 or applications 136). Examples of suitable client devices 130 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail in regard to FIGS. 5 and 6.

The client device 130 may include one or more applications 136. Each application 136 may be a computer program executed on the client device 130 that configures the device to be responsive to user input to allow a user to provide audio input in the form of spoken words via the application 136. Examples of suitable applications include, but are not limited to, a productivity application (e.g., job searching application that provides a job interview coach or a training application that trains employees such as customer service staff on responding to customers, etc.), a presentation application (e.g., Microsoft PowerPoint), a document editing application, a communications application or a standalone application designed specifically for providing speech rehearsal assistance.

In some examples, applications used to receive user audio input and provide feedback may be executed on the server 110 (e.g., applications 122) and be provided via an online service. In one implementation, web applications may communicate via the network 130 with a user agent 132, such as a browser, executing on the client device 130. The user agent 132 may provide a user interface that allows the user to interact with applications 122 and may enable applications 122 to provide user data to the speech rehearsal assistance service 114 for processing. In other examples, applications used to receive user audio input and provide feedback may be local applications such as the applications 136 that are stored and executed on the client device 130 and provide a user interface that allows the user to interact with application. User data from applications 136 may also be provided via the network 130 to the speech rehearsal assistance service 114 for use in providing speech analysis and speech rehearsal feedback.

Figure 2:
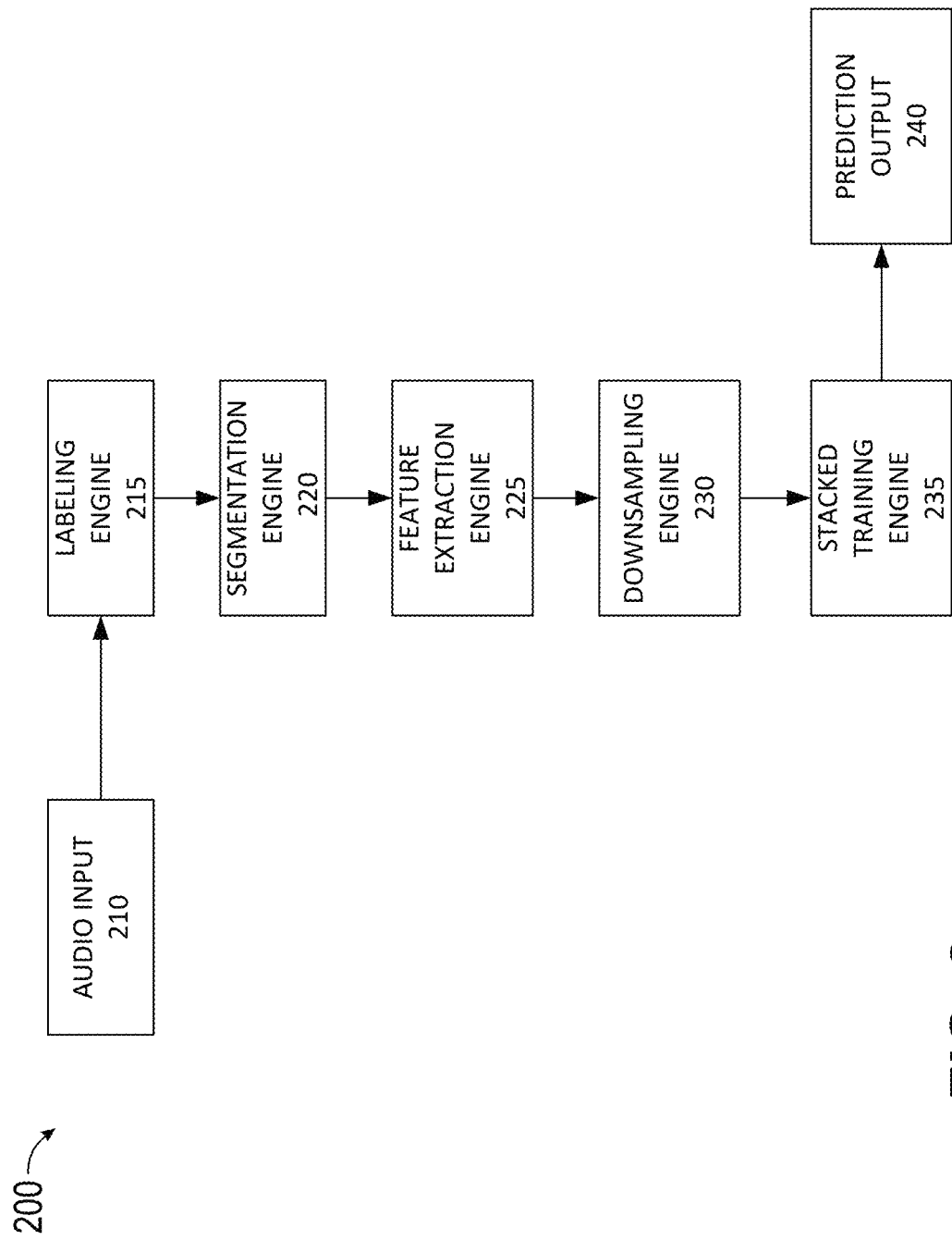
FIG. 2 depicts a simplified architecture for the operations of the speech analysis engine used to detect specific speech features.

FIG. 2 depicts a simplified architecture 200 for training the speech analysis engine used to detect specific speech features. Architecture 200 may include audio input 210 which may be derived from raw audio training data. This may include audio data that is derived from two-sided telephone conversations among numerous speakers and/or audio data collected from speeches (e.g., extemporaneous speech) on a variety of topics in various acoustic conditions such as large conference rooms, medium sized meeting rooms and auditoriums and small rooms using different types of microphones. This raw audio data may be collected over time and cleaned to create the audio input 210.

Once the audio input 210 is ready for use, it may be processed via a labeling engine 215. The labeling engine 215 may include human labeling. This may involve an experienced team of one or more users that are trained in labeling datasets such as audio data. The team may listen to each of the audio files and identify occurrences of particular speech features at specific locations in the audio data. For example, they may listen to an audio file and determine whether there are any filled pauses, speech disfluency or indications of stress in the audio file, identify the location at which they occur within the file and the duration of the feature (e.g., duration of a filled pause). Whether or not a parameter qualifies as a feature of interest may be predetermined and based on guidelines set for the speech rehearsal program. For example, which words or phrases qualify as a filler pause may be predetermined and set by the speech rehearsal program. Alternatively, this may be determined by one or more members of the team. Regardless of the manner in which the guidelines are set, a standardized set of rules or guidelines may be created for use by the labeling team such that the labeling process is uniform. In one implementation, the labeling process is achieved by examining transcriptions of the audio data. The transcripts may be generated using an ASR system. Such transcripts may include spoken words, disfluencies and other non-speech events. Thus, by examining the transcripts, filled pauses, disfluencies and/or other speech features may be identified. The transcripts may then be time aligned with the audio data to assign start times and durations to the identified speech features (e.g., to filled pauses and disfluencies). By labeling speech features of interest in the audio input, architecture 200 ensures that the data can be used in training models that can accurately predict these speech features.

Once the input data 210 is labeled via the labeling engine 215, the labeled data may be segmented via the segmentation engine 220. Segmentation may include dividing the audio input into segments of consecutive frames. Each segment may consist of an acoustic segment which forms an utterance. An utterance may refer to one or more words, phrases, or non-speech events. In one implementation, an utterance consistent of one acoustic segment. Generating utterances from the audio data may be done by using an ASR system or standard speech recognition toolkit such as Kaldi. Acoustic segmentation is known in the art and as such is not discussed in detail here.

In one implementation, segmentation may be performed prior to labeling. In this manner, after utterances are generated, they may be annotated (e.g., by a human) with words, filler pauses and/or disfluencies.

After the audio data is segmented, a feature extraction engine 225 may be employed to extract features of interest in the segmented audio input. In one implementation, the feature extraction engine 225 is a standard speech recognition toolkit such as Kaldi. The feature extraction engine 225 may be used to extract standard speech features from the audio data by estimating a multi-dimensional feature vector over windows/frames of a given size (e.g., 25 milliseconds) sliding over each utterance at a set frequency (e.g., sliding every 10 milliseconds over the utterance). The specific given size of the frames may be determined based on empirical observations and testing to determine a length that achieves the desired results in the trained models. The standard features may include one or more Mel-frequency cepstral coefficients (MFCCs) (e.g., 14 MFCCs), normalized continuous pitch, probability of voicing, pitch delta, a number of formant frequencies (e.g., first 4 formant frequencies) and their bands. Formants may be estimated using the complex roots of the linear predictive coding (LPC) polynomial estimated during pitch tracking. The extracted features may form a feature vector. Depending on the size of the utterance, this results in one or more multi-dimensional (e.g., 25 dimensional) feature vectors for each utterance. The size of the feature vector may change depending on the number of features extracted. In addition to generating feature vectors from the audio frames, each audio frame may also be labeled (e.g., flagged) to indicate whether the span of the frame includes a speech feature of interest (e.g., a filled pause or disfluency). This may be achieved by examining the frames against labeling information. In this manner, the audio input may be converted into multi-dimensional feature vectors that can be used in training the models. In one implementation, the segmentation engine 220 and the feature extraction 225 are both part of the same standard speech recognition toolkit.

Once a feature vector is created for each frame, a down-sampling engine 230 may be used to downsample the feature vectors. This is because the rate at which feature extraction engine extracts features over an utterance may be smaller than the size of the frame over which the features are extracted (e.g., the frame size is 25 milliseconds while the features are extracted every 10 milliseconds). As a result, there is redundancy between consecutive frames which carry redundant information. Furthermore, human speech is often fluent and continuous. As a result, under sufficient sampling frequency, the features do not change substantially from frame to frame. Moreover, detection of speech features that are useful for speech rehearsal may not need all the details of transitions in speech. As a result, the data can be down-sampled to increase efficiency and decrease costs without substantially effecting accuracy.

Figure 3:
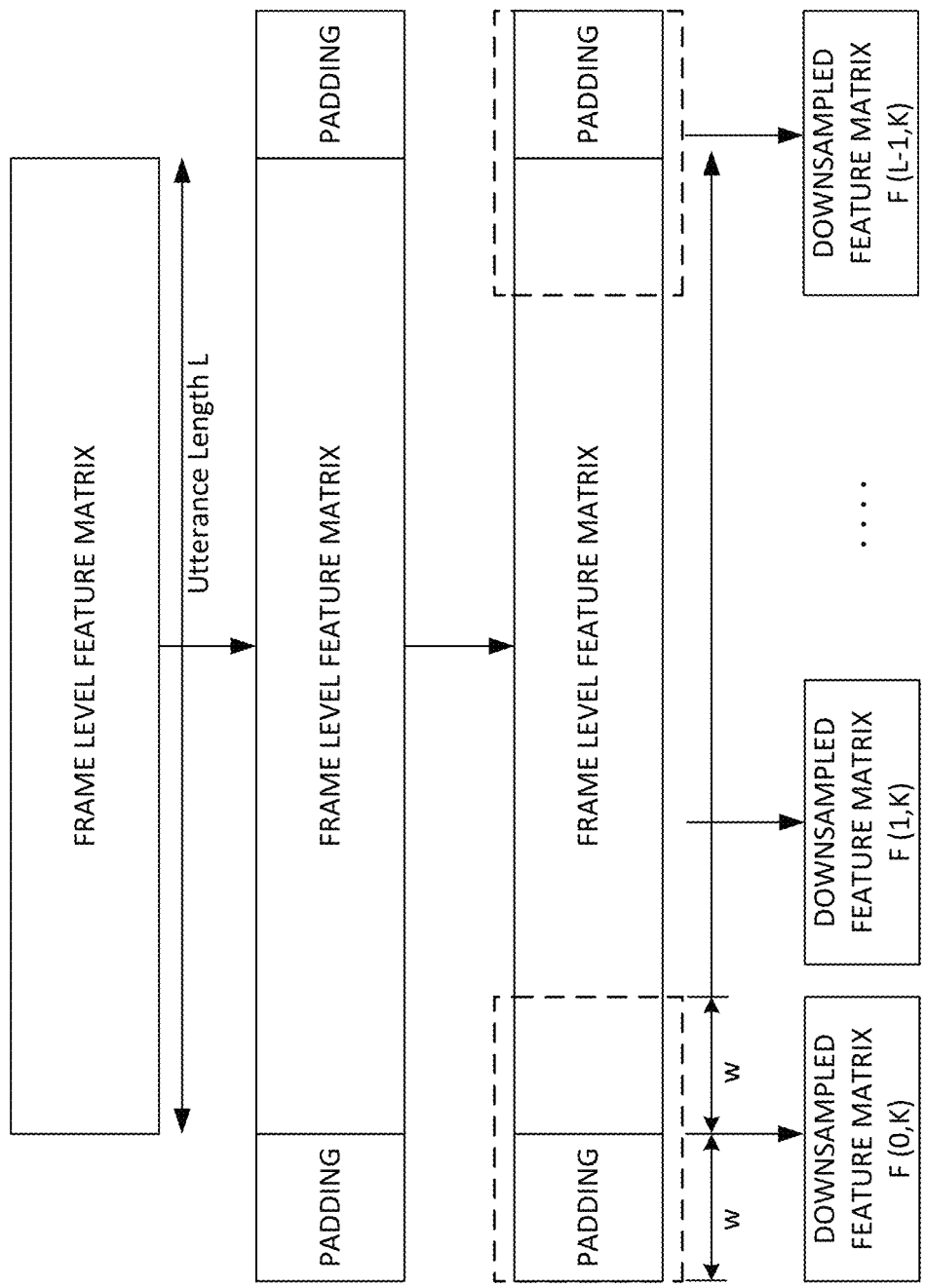
FIG. 3 depicts applying a sliding window to feature vectors for frames that make up the segmentation of the audio data.

In one implementation, the down sampling engine 230 includes a sliding window with a window size of (w) which may be applied to the feature vectors to sample the entire feature vector set for each utterance. This is illustrated in FIG. 3 which depicts applying the sliding window to frame level feature vectors of frames that make up an utterance. Considering having K acoustic features and an utterance with L time frames, the k-th acoustic feature at time t, may be denoted as $V_{t,k}$, where k is between 0 and K and t is between 0 and L. Because the utterance length, L, may vary and providing the entire sequence to the models may be computationally intensive, the frame level feature matrices may be downsampled by sliding a sampling window from the first frame to the last frame. In one implementation, the sampling may cover w time frames before and after a current frame of interest to provide contextual information for the frame of interest.

In one implementation, the sampling is achieved by first adding padding to the left and right sides of the feature vectors, as illustrated in FIG. 3. This is because the sliding window examines before and after. As a result, padding should be added to the left side to enable full sliding. Moreover, since there is sometimes a pause near the end of an utterance, padding may be added to the right side to cover that scenario. This may be done by appending a number of zero vectors as paddings on both ends of the utterance. In an example, the number of zero vectors is ω×K. The resulting raw feature vector at time frame t may be denoted as $F_{raw}(t,k)$ which can be calculated via equation 1 and is a K×(2·ω+1) matrix.

$$F_{raw}(t,k) = (V_{t',k'})_{t' \in [t-\omega, t+\omega], k' \in [0,K)} \quad (1)$$

The sliding window may then be used to downsample the resulting feature vector with a step size s along the time axis to obtain low-level vector features. Thus, the sliding window downsamples each feature vector and is then moved by a specific number of frames to sample the next vector until the sliding window reaches the end of the resulting feature vector (e.g., end of the utterance and padding). Moving the sliding window by a specific number (e.g., m frames) may be done to examine frames before and after a current frame. In this manner the window is likely to cover likely sequence of words that lead to specific speech features such as a filler phrase. For example, the window is likely to cover a sequence of words uttered before and after a filler phrase. In one example, the sliding window examines 10 frames before and 10 frames after a current frame. In another example, the sampling rate used is 8 frames.

As a result of the sliding window sampling operation, the raw audio data is turned into sequentially sampled feature vectors (e.g., an array of data) that can be provided as input to the training models for their training. The sampled feature vectors contain features from before and after specific speech features (e.g., filler phrase).

Referring back to FIG. 2, the labeling engine 215, the segmentation engine 220, the feature extraction engine 225 and the downsampling engine 230 may constitute a data processing phase of the architecture 200, while the stacked training engine 235 forms the speech feature detection phase. In one implementation, the speech feature detection phase involves training models that include a stacked sequence-to-sequence model ensemble containing three parts. The result of the final model in the stacked sequence-to-sequence model ensemble is providing outputs such as the prediction output 240 that predict speech features such as clarity, stress level, filter pauses, disfluency and the like.

Figure 4A:
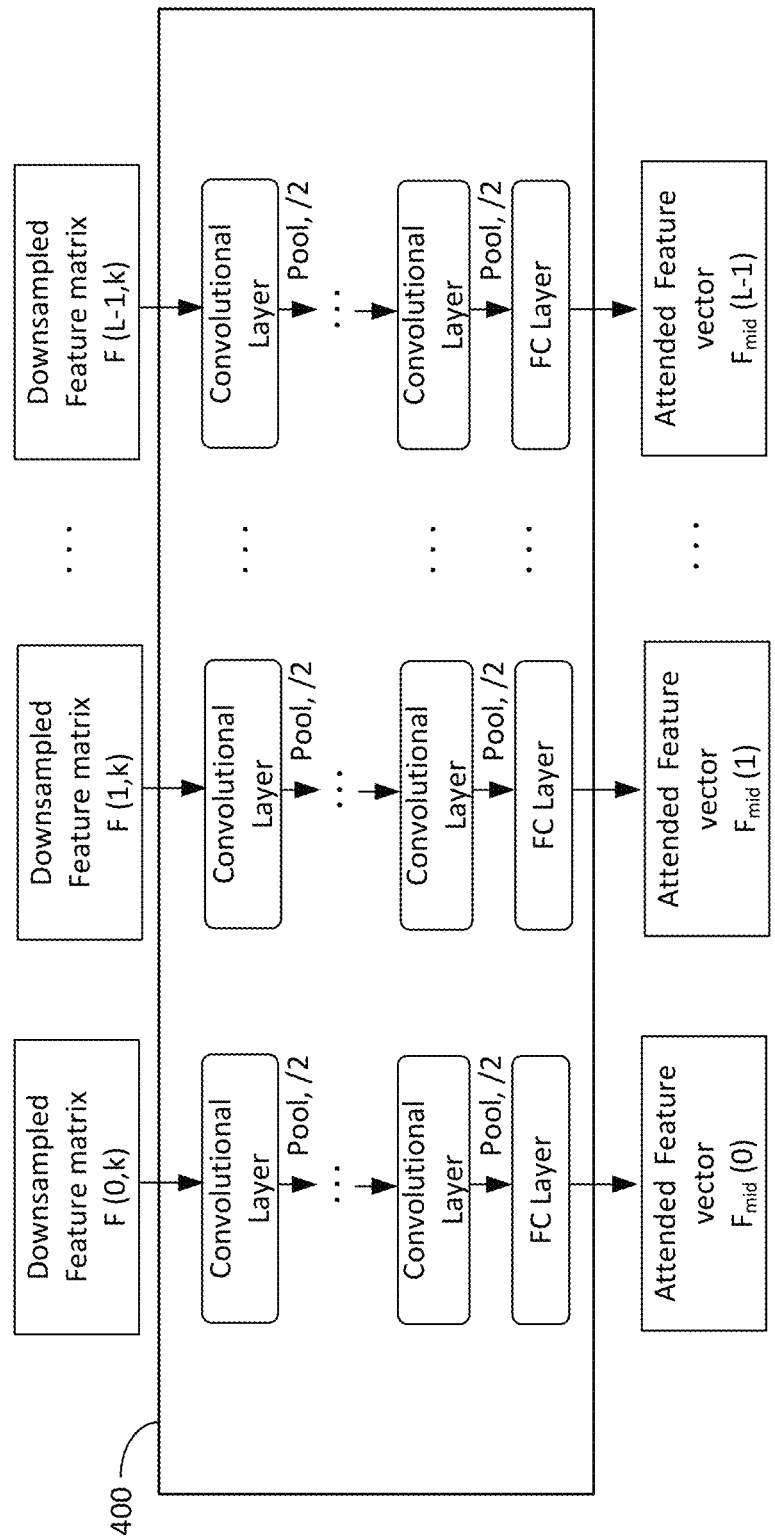
FIGS. 4A-4C depict example machine learning models that can be used in the stacked machine learning model ensemble for detecting speech features.
Figure 4B:
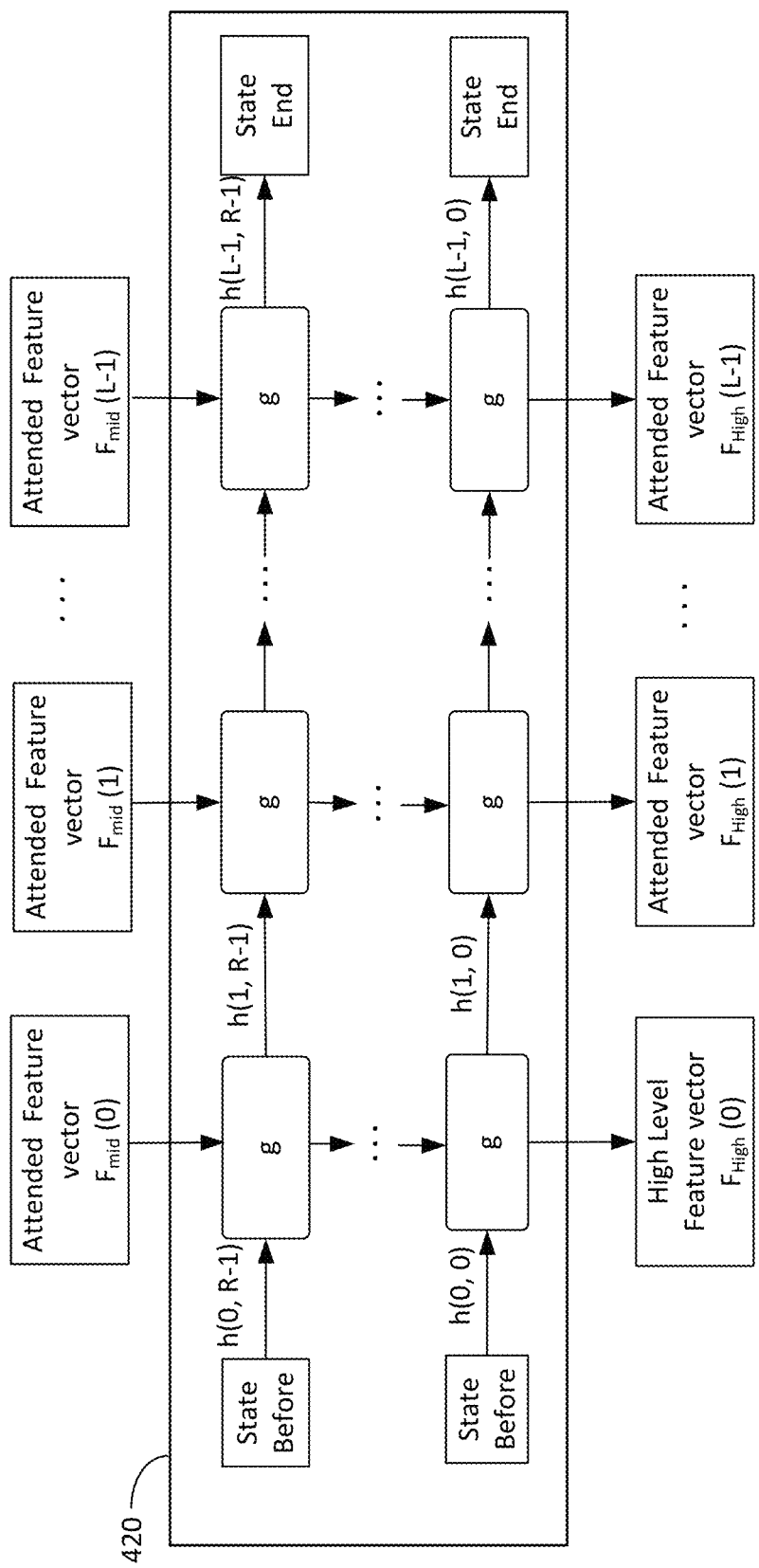
Figure 4C:
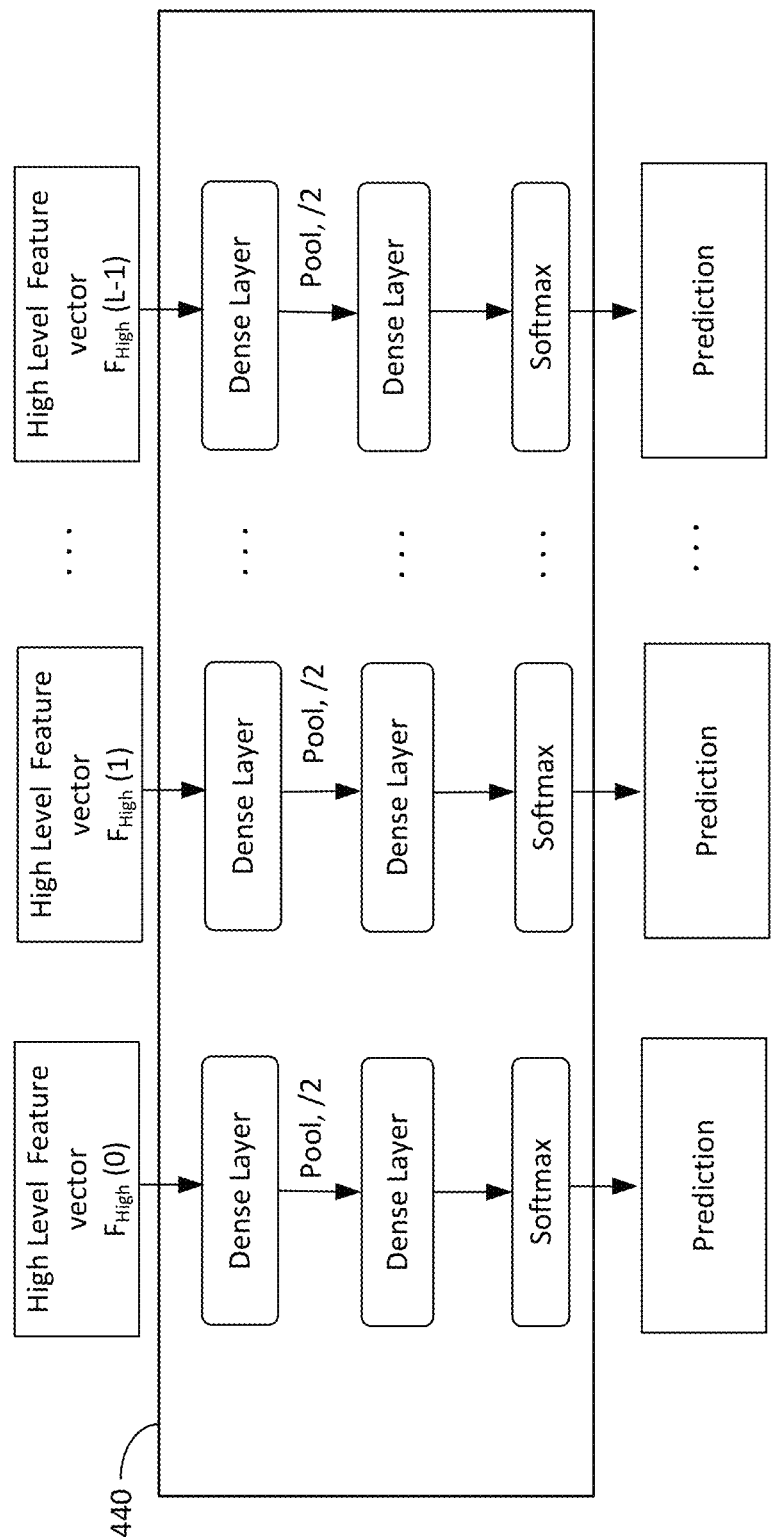

FIGS. 4A-4C depict example ML models that can be used in the stacked ML model architecture for detecting speech features. In one implementation, these models include an attention and aggregation model, a sequence to sequence learning model and a classification model. FIG. 4A depicts an example attention and aggregation mode 400. The attention and aggregation model may be used to learn which features in the audio are important and how are they related. That is because in the low-level feature matrices that are provided as the output of the data processing phase of the system, each feature k may be weighted equally within the time window. However, the features at the central frame may be more important than the ones at the corner frames. Furthermore, when speakers pronounce filler pauses to fill a gap between the current word and an upcoming word, there may be a minimal coarticulation effect, as the speakers may not change their positions during the filler pauses. As a result, the vocal tract characteristics of the speech may not change during the pronunciation of filler pauses. This may result in vocal tract resonances (e.g., formants) remaining stable over the duration of a filler pause. This information can be used to identify filler pauses. Thus, an attention mechanism may be useful to extract important features and correlations out of the low-level feature matrices. In an example, this can be achieved by applying a genetic heuristic-based filter. However, such a filter may be difficult to tune and prone to scalability issues. As a result, in one implementation, a CNN model is used as the attention and aggregation model 400. This may involve treating the low-level feature matrices as images and applying a CNN model as the first block to aggregate the low-level acoustic features and learn the attended weights in the time window.

In an example, the CNN model treats the array of data as a feature graph, where the x axis represents time and the y axis represents the features that make up the array. The CNN model may then be trained to determine relationships between different features and add weights to features that are more important and should thus be paid more attention to. Thus, the CNN model may aggregate features in the nearby frames and learn the attended weights for those features. As depicted in FIG. 4A, in one implementation, the CNN model is a deep convolutional neural network model with maximum pooling to further aggregate the features in the sliding window. The maximum pooling may be applied after each convolution layer to reduce the feature dimension. The CNN model may be a multi-layer CNN (e.g., 1, 2, or 3-layer CNN) that uses maximum pooling. Other configurations are also possible. A fully connected layer may be appended after the convolution layers to flatten the aggregated and attended feature maps into mid-level feature vectors $F_{mid}(t)$. It should be noted that other attention-based neural network models may also be used for this operation.

After training the CNN model to provide weights to important features of the array, the mid-level feature vectors may be provided to a sequence to sequence learning model. That is because the attended and aggregated mid-level feature vectors may only carry information around frame t. To cover long-term sequence information for accurate detection of speech features of interest, an increased window size for the sliding window may be utilized. However, that may result in exponentially increasing training time and memory consumption as well as a burden on the attention and aggregation model. Utilizing a sequence to sequence learning model or an attention-based neural network model can achieve the same goals while avoiding the substantial increase in time and resources.

An example sequence to sequence learning model 420 is depicted in FIG. 4B. The sequence to sequence learning model 420 receives the attended mid-level feature vectors $F_{mid}(0), F_{mid}(1) \ldots F_{mid}(L-1)$ and provides them to an example model g(.). In an example, the sequence to sequence model is a LSTM model. In another example, the sequence to sequence model is a recurrent neural network model such as a gated recurrent unit (GRU) model. The LSTIM or GRU models may be used to handle long-term sequence information. The sequence to sequence model 420 may be used to learn the aggregated features, learn the sequence to sequence conversion and generate prediction sequence scores. The sequence to sequence model may be uni-directional or bi-directional. For example, a Bi standards LSTM (Bi-LSTM) may be used in one implementation. The sequence to sequence model 420 depicts a uni-directional R-layer example for an utterance with L frames, where each high-level feature vector $F_{High}(t)$ is learnt based on the previous states and the current mid-level feature vector $F_{mid}(t)$ at frame t.

Once the sequence to sequence model has been trained to generate the high-level feature vectors $F_{High}(t)$, the results can be used to classify each frame as either including a speech feature of interest (e.g., filler pause, disfluency, etc.) or not including any speech features of interest. This can be achieved by providing the high-level feature vectors $F_{High}(t)$ to a classification model.

An example classification model 440 for classifying each frame is depicted in FIG. 4C. The classification model 440 may receive the high-level feature vectors $F_{High}(t)$ and apply them to one or more dense layers where maximum pooling may be applied before it provides the results to a softmax to generate a prediction as an output. This may be done by providing prediction sequence scores generated by the sequence to sequence model as part of the high-level feature vectors provided as input to the model to make final predictions based on the prediction sequence scores. In an example, the classification model is a multi-layer DNN model. The DNN model may be able to predict whether an audio segment includes filler phrases based on the prediction sequence scores provided by the sequence to sequence model. Thus, the classification model may predict the number of filler pauses and/or other speech features in an utterance. In one implementation, a multi-layer DNN is used to provide more accuracy than a single projection layer. Use of the classification model in the technical solution may increase accuracy and efficiency and provide the ability to make prediction decisions on the fly. Use of the classification model may also strengthen the decision-making capacity of the sequence-to sequence model (e.g., LSTM model) by considering a wide range of scores together. The classification model may also provide a higher capacity. The decision-making functions of the DNN model may be performed by any other decision making and/or classification model. These may include model structures such as random forest trees. In one implementation, the decision-making model may not need to be a large or deep model to provide accurate results.

In one implementation, once each of the three models that make up the stacked machine learning model architecture are trained, one or more training datasets are used to evaluate the models' accuracy. This may involve using a speech rehearsal dataset that has been pre-labeled by humans. In an example, results observed by running the trained models with the training dataset indicate similar precision and accuracy by using the stacked sequence-to-sequence model architecture as the precision and accuracy when an ASR is used. The technical solution can achieve similar results using fast-learning models that are inexpensive to train, deploy and use. The models can be trained by using small datasets directly extracted from only a few basic audio features like MPCC and formants. The number of features extracted are thus a lot fewer than some other speech analysis mechanisms (e.g., ASR). Yet, the trained models achieve similar results. The models can also be quickly trained to arrive at their desired configuration, whereas currently used systems may take much longer to train.

The trained models may then be utilized as part of a speech analysis engine to provide speech analysis for various functions. The process of providing speech analysis for an audio input may be similar to the training process discussed above in that it may include preprocessing of the audio input data to provide segmentation, feature extraction and downsampling to generate low-level feature vectors. These low-level feature vectors may then be fed to the stacked machine learning model to generate predicted speech features.

Thus, in different implementations, a technical solution may be provided for providing speech analysis. Multiple models may be trained using training datasets to analyze an audio file and predict whether the audio file contains certain speech features. This may be achieved by using small training datasets that can train the models quickly. The models may include a feature aggregation and attention model, a sequence to sequence model and a decision-making model. Once trained, the models can be used in combination to provide accurate results efficiently. As a result, accurate speech analysis may be provided using simple models that are efficient to train and use.

Figure 5:
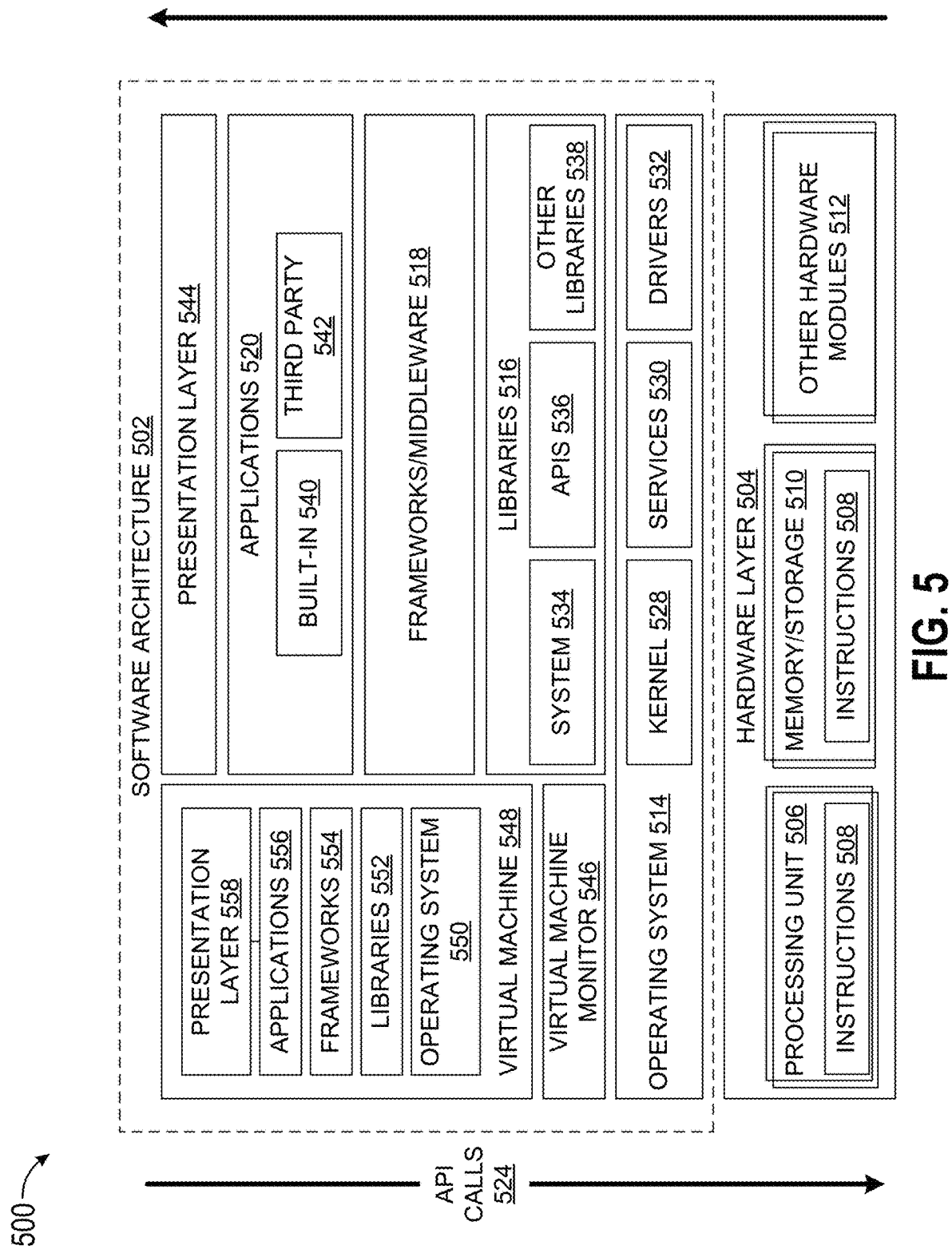
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 508 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 524. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 520 and/or third-party applications 522. Examples of built-in applications 520 may include, but are not limited to, a contacts application, a browser application, a location application, a media application, a messaging application, and/or a game application. Third-party applications 522 may include any applications developed by an entity other than the vendor of the particular system. The applications 520 may use functions available via OS 514, libraries 516, frameworks 518, and presentation layer 524 to create user interfaces to interact with users.

Some software architectures use virtual machines, as illustrated by a virtual machine 528. The virtual machine 528 provides an execution environment where applications/modules can execute as if they were executing on a hardware machine (such as the machine 600 of FIG. 6, for example). The virtual machine 528 may be hosted by a host OS (for example, OS 514) or hypervisor, and may have a virtual machine monitor 526 which manages operation of the virtual machine 528 and interoperation with the host operating system. A software architecture, which may be different from software architecture 502 outside of the virtual machine, executes within the virtual machine 528 such as an OS 550, libraries 552, frameworks 554, applications 556, and/or a presentation layer 558.

Figure 6:
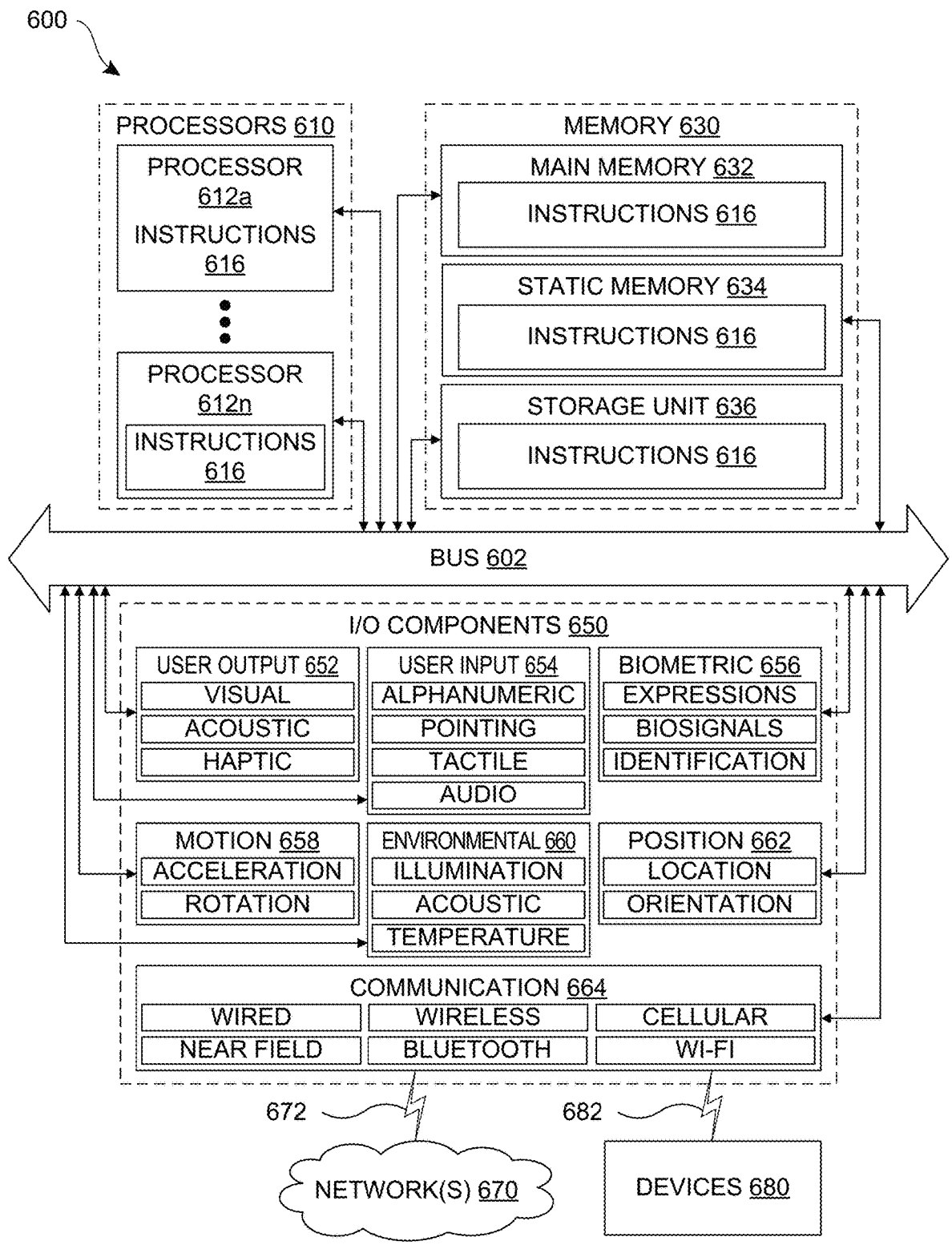
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

Devices and methods for improving visibility for providing an integrated system for conducting speech analysis using a combination of deep learning models are described. Devices can include a data processing system which includes processor, and a memory in communication with the processor, the memory comprising executable instructions that, when executed by the processor, cause the data processing system to perform various functions. The functions may include receiving speech audio data, performing preprocessing on the speech audio data to prepare the speech audio data for use in training one or more models that detect one or more speech features, and providing the preprocessed speech audio data to a stacked sequence to sequence model for training the stacked sequence to sequence model to detect the one or more speech features. The stacked sequence to sequence model includes a feature aggregation model, a sequencing model, and a decision-making model.

In one implementation devices may include a data processing system which includes processor, and a memory in communication with the processor, the memory comprising executable instructions that, when executed by the processor, cause the data processing system to perform various functions. The functions may include receiving speech audio data, performing preprocessing on the speech audio data to prepare the speech audio data for use as input in one or more models that detect one or more speech features, providing the preprocessed speech audio data to a stacked sequence to sequence model, analyzing the preprocessed speech audio data via the stacked sequence to sequence model to detect the one or more speech features. The stacked sequence to sequence model includes a feature aggregation model, a sequencing model, and a decision-making model.

In one implementation, the feature aggregation model is a deep convolutional neural network for aggregating features in the preprocessed speech data. In one implementation, the sequencing model is a long short-term memory model for generating a prediction sequence score. In one implementation, the decision-making model is deep neural network for making a classification based on the prediction sequence score While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory storing executable instructions that, when executed by the processor, cause the data processing system to perform functions of:
receiving speech audio data;
performing preprocessing on the speech audio data to prepare the speech audio data for use in training one or more models that detect one or more speech features; and
providing the preprocessed speech audio data to a stacked machine learning (ML) model for training the stacked ML model to detect the one or more speech features, wherein the stacked ML model includes a feature aggregation model, a sequence to sequence model, and a decision-making model.

Item 2. The data processing system of item 1, wherein the feature aggregation model is an attention-based feature aggregation model for aggregating features in the preprocessed speech data.

Item 3. The data processing system of items 1 or 2, wherein the sequence to sequence model is a long short-term memory model for generating a prediction sequence score.

Item 4. The data processing system of item 3 wherein the decision-making model is a deep neural network for making a classification based on the prediction sequence score.

Item 5. The data processing system of any of the preceding items, wherein the preprocessing includes segmenting the speech audio data into a plurality of utterances and labeling at least one of the plurality of utterances.

Item 6. The data processing system of item 5, wherein the preprocessing further includes extracting one or more audio features from the speech audio data for each of the plurality of utterances.

Item 7. The data processing system of item 6, wherein the preprocessing further includes downsampling the one or more audio features for each of the plurality of utterances.

Item 8. The data processing system of any of the preceding items, wherein the one or more speech features include at least one of a filler pause, clarity, stress level, and disfluency.

Item 9. A data processing system comprising:
a processor; and
a memory in communication with the processor, the memory comprising executable instructions that, when executed by the processor, cause the data processing system to perform functions of:
receiving speech audio data;
performing preprocessing on the speech audio data to prepare the speech audio data for use as an input into one or more models that detect one or more speech features;
providing the preprocessed speech audio data to a stacked ML model; and
analyzing the preprocessed speech audio data via the stacked ML model to detect the one or more speech features,
wherein the stacked ML model includes a feature aggregation model, a sequence to sequence, and a decision-making model.

Item 10. The data processing system of item 9, wherein the feature aggregation model is a deep convolutional neural network for aggregating features in the preprocessed speech data.

Item 11. The data processing system of items 9 or 10, wherein the sequence to sequence model is a long short-term memory model for generating a prediction sequence score.

Item 12. The data processing system of item 11, wherein the decision-making model is deep neural network for making a classification based on the prediction sequence score.

Item 13. The data processing system of any of items 9 to 12, wherein the preprocessing includes segmenting the speech audio data into a plurality of utterances.

Item 14. The data processing system of item 13, wherein the preprocessing further includes extracting one or more audio features from the speech audio data for each of the plurality of utterances.

Item 15. The data processing system of item 14, wherein the preprocessing further includes downsampling the one or more audio features for each of the plurality of utterances.

Item 16. The data processing system of any of items 9 to 15, wherein the one or more speech features include at least one of a filler pause, clarity, stress level, and disfluency.

Item 17. A method for detecting one or more speech features in speech audio data comprising:
receiving the speech audio data;
performing preprocessing on the speech audio data to prepare the speech audio data for use as an input into one or more models that detect the one or more speech features;
providing the preprocessed speech audio data to a stacked ML model; and
analyzing the preprocessed speech audio data via the stacked ML model to detect the one or more speech features,
wherein the stacked ML model includes a feature aggregation model, a sequence to sequence model, and a decision-making model.

Item 18. The method of item 17, wherein preprocessing the speech audio data includes segmenting the speech audio data into one or more utterances, extracting one or more features from each of the one or more utterances, and downsampling the one or more extracted features to generate low-level feature vectors for providing to the stacked ML model.

Item 19. The method of items 17 or 18, wherein the one or more extracted features include at least one of one or more Mel-frequency cepstral coefficients (MFCCs), normalized continuous pitch, probability of voicing, pitch delta, a number of formant frequencies and one or more bands for each formant frequency.

Item 20. The method of any of items 17 to 20, wherein the one or more extracted features form a feature vector.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
receiving a training data set, the training data set including speech audio data that is labeled to identify occurrences of one or more speech features at specific locations in the speech audio data, the one or more speech features being features that indicate one or more problems in a speaker's speech;
performing preprocessing on the speech audio data to prepare the speech audio data for use in training one or more models that detect in an audio data only the one or more speech features that indicate the one or more problems; and
providing the preprocessed speech audio data to a stacked machine learning (ML) model for training the stacked ML model to detect the one or more speech features,
wherein:
the stacked ML model includes a feature aggregation model, a sequence to sequence model, and a decision-making model, and
the sequence to sequence model is trained to receive feature vectors from the feature aggregation model, identify one or more sequences, the one or more sequences including a previous state and a current state, and generate a prediction sequence score for at least one of the one or more identified sequences, the prediction sequence score representing a likelihood of the at least one of the one or more identified sequences being indicative of the at least one of the one or more speech features that indicate the one or more problems.

2. The data processing system of claim 1, wherein the feature aggregation model is an attention-based feature aggregation model for aggregating features in the preprocessed speech audio data.

3. The data processing system of claim 1, wherein the sequence to sequence model is a long short-term memory model for generating the prediction sequence score.

4. The data processing system of claim 3, wherein the decision-making model is a deep neural network for making a classification based on the prediction sequence score.

5. The data processing system of claim 1, wherein the preprocessing includes segmenting the speech audio data into a plurality of utterances and labeling at least one of the plurality of utterances.

6. The data processing system of claim 5, wherein the preprocessing further includes extracting one or more audio features from the speech audio data for each of the plurality of utterances.

7. The data processing system of claim 6, wherein the preprocessing further includes downsampling the one or more audio features for each of the plurality of utterances.

8. The data processing system of claim 1, wherein the one or more problems include at least one of a filler pause, lack of clarity, indication of stress, and disfluency.

9. A data processing system comprising:
a processor; and
a memory in communication with the processor, the memory comprising executable instructions that, when executed by the processor, cause the data processing system to perform functions of:
receiving speech audio data that includes occurrences of one or more speech features at specific locations in the speech audio data, the one or more speech features being features that indicate one or more problems in a speaker's speech;
performing preprocessing on the speech audio data to prepare the speech audio data for use as an input into one or more models that only detect the one or more speech features that indicate the one or more problems;
providing the preprocessed speech audio data to a stacked ML model; and
analyzing the preprocessed speech audio data via the stacked ML model to detect the one or more problems,
wherein:
the stacked ML model includes a feature aggregation model, a sequence to sequence model, and a decision-making model, and
the sequence to sequence model is trained to receive feature vectors from the feature aggregation model, identify one or more sequences, the one or more sequences including a previous state and a current state, and generate a prediction sequence score for at least one of the one or more identified sequences, the prediction sequence score representing a likelihood of the at least one of the one or more identified sequences being indicative of the at least one of the one or more speech features that indicate the one or more problems.

10. The data processing system of claim 9, wherein the feature aggregation model is a deep convolutional neural network for aggregating features in the preprocessed speech data.

11. The data processing system of claim 9, wherein the sequence to sequence model is a long short-term memory model for generating the prediction sequence score.

12. The data processing system of claim 11, wherein the decision-making model is a deep neural network for making a classification based on the prediction sequence score.

13. The data processing system of claim 9, wherein the preprocessing includes segmenting the speech audio data into a plurality of utterances.

14. The data processing system of claim 13, wherein the preprocessing further includes extracting one or more audio features from the speech audio data for each of the plurality of utterances.

15. The data processing system of claim 14, wherein the preprocessing further includes downsampling the one or more audio features for each of the plurality of utterances.

16. The data processing system of claim 9, wherein the one or more problems include at least one of a filler pause, lack of clarity, indication of stress, and disfluency.

17. A method for detecting one or more speech features in speech audio data comprising:
receiving the speech audio data, the speech audio data including occurrences of one or more speech features at specific locations in the speech audio data, the one or more speech features being features that indicate one or more problems in a speaker's speech;
performing preprocessing on the speech audio data to prepare the speech audio data for use as an input into one or more models that only detect the one or more speech features that indicate the one or more problems;
providing the preprocessed speech audio data to a stacked ML model; and
analyzing the preprocessed speech audio data via the stacked ML model to detect the one or more problems,
wherein:
the stacked ML model includes a feature aggregation model, a sequence to sequence model, and a decision-making model, and
the sequence to sequence model is trained to receive feature vectors from the feature aggregation model, identify one or more sequences, the one or more sequences including a previous state and a current state, and generate a prediction sequence score for at least one of the one or more identified sequences, the prediction sequence score representing a likelihood of the at least one of the one or more identified sequences being indicative of the at least one of the one or more speech features that indicate the one or more problems.

18. The method of claim 17, wherein preprocessing the speech audio data includes segmenting the speech audio data into one or more utterances, extracting one or more features from each of the one or more utterances, and downsampling the one or more extracted features to generate low-level feature vectors for providing to the stacked ML model.

19. The method of claim 18, wherein the one or more extracted features include at least one of one or more Mel-frequency cepstral coefficients (MFCCs), normalized continuous pitch, probability of voicing, pitch delta, a number of formant frequencies and one or more bands for each formant frequency.

20. The method of claim 17, wherein the one or more extracted features form a feature vector.

* * * * *